(12) United States Patent
Borg, Jr. et al.

(10) Patent No.: US 6,414,301 B1
(45) Date of Patent: Jul. 2, 2002

(54) PHOTOELECTRIC ICE BIN CONTROL SYSTEM

(75) Inventors: Russell A. Borg, Jr., Senoia; Earl B. Graffius, Peachtree City; Jeff Snelling, Griffin, all of GA (US)

(73) Assignee: Hoshizaki America, Inc., Peachtree City, GA (US)

( * ) Notice: Subject to any disclaimer, the term of this patent is extended or adjusted under 35 U.S.C. 154(b) by 0 days.

(21) Appl. No.: 09/310,197

(22) Filed: May 12, 1999

Related U.S. Application Data

(60) Provisional application No. 60/085,520, filed on May 14, 1998.

(51) Int. Cl.[7] .................................................. H01J 40/14
(52) U.S. Cl. ........................................ 250/222.1; 62/137
(58) Field of Search .............................. 250/221, 222.1, 250/222.2, 223 R, 239; 62/344, 66, 137; 356/614, 623, 624; 340/612, 618, 619

(56) References Cited

U.S. PATENT DOCUMENTS

| | | | |
|---|---|---|---|
| 4,993,232 A | * 2/1991 | Tatematsu et al. | 62/137 |
| 5,060,484 A | * 10/1991 | Bush et al. | 62/137 |
| 5,325,679 A | * 7/1994 | Tatematsu et al. | 62/188 |
| 5,477,694 A | * 12/1995 | Black et al. | 62/73 |

FOREIGN PATENT DOCUMENTS

| JP | 09269169 | * 10/1997 |
|---|---|---|

* cited by examiner

*Primary Examiner*—Kevin Pyo
(74) *Attorney, Agent, or Firm*—Arent Fox Kintner Plotkin & Kahn, PLLC

(57) ABSTRACT

An ice making machine is provided which includes an ice making section; an ice discharge port connected to the ice making section for receiving ice made in the ice making section; an ice storage section for storing ice produced in the ice making section; an ice delivery chute interconnecting said ice discharge port the said ice storage section; and an ice storage level detecting apparatus including an ice storage level sensor disposed in the ice delivery chute proximate an outlet end of said ice delivery chute. An ice storage level detecting apparatus for an ice making machine is also provided which includes an ice storage level sensor, a housing to receive the ice level storage sensor, the housing adapted to be affixed within an ice delivery chute of an ice making machine at or adjacent an outlet of the ice delivery chute.

6 Claims, 3 Drawing Sheets

PHOTOELECTRIC ICE BIN CONTROL SYSTEM

This application claims the benefit of U.S. Provisional Application No. 60/085,520, filed May 14, 1998.

BACKGROUND OF THE INVENTION

1. Technical Field

Generally, the present invention relates to an apparatus and a method for monitoring and controlling material levels within a container. More particularly, the present invention relates to automatic ice making machines and to control systems for adjusting the level of ice stored in a storage bin of an automatic ice making machine.

2. Related Art

Numerous devices and methods have been known and used for monitoring the amount of a material stored within a container. While many of these devices and methods produce quite accurate and reproducible results with respect to their monitoring function, they are less reliable when coupled with a means for regulating the amount of material delivered to, retained, or stored in a container. Frequently, the shortcomings of such monitoring and regulating devices are attributable to either the physical characteristics of the material being stored, the monitoring means, the regulating means or all of the foregoing. Thus, the physical state of the material being stored, a liquid, solid or gas, and the possible changes between these states of matter may have a significant effect both on monitoring of the material and regulation of the amount of material delivered to the storage container. In addition, both the means of monitoring such materials, including various sensors and related components, currently both mechanical and electrical in nature, vary with the conditions and nature of the material being regulated in how effective the overall system is in achieving its objectives.

Partly because of the inherent physical characteristics of ice, methods and devices for producing, regulating the production and storage of ice have proliferated in the twentieth century. Thus, both in the commercial production of ice and in home ice makers, devices are provided to monitor the level of ice in a storage container and to supply such information to the apparatus which actually produces the ice or delivers the ice to the storage container in a desired form. Such monitoring and control devices are employed in ice-making machines to avoid damage to the ice-producing device and as a convenience to users in avoiding overfilling and spillage from the ice storage bin. The physical characteristics of ice being a solid well below room temperature and being a liquid at and somewhat below room temperature has provided both the basis of monitoring and regulating devices and has also been associated with some of the shortcomings of such devices. Thus, a great number of sensors rely on the fact that ice is in the solid state when stored, while other devices depend on the temperature at which ice remains in the solid state.

Many of the devices currently used in ice machines for detecting and regulating the amount of ice stored within a reservoir type bin are not as effective in controlling the level of ice within a storage bin container as sought for both large scale commercial production ice making machines and small scale ice making machines used in the home environment. Other devices, while functioning both properly and efficiently, are either difficult to install or to remove for repair or replacement.

Many of the monitoring systems used for ice level control devices for the storage bins of ice machines employ sensors or monitors which are either substantially mechanical, thermostatic (temperature), ultrasonic, or photoelectric type sensors.

Typical mechanical type control systems employ a rod or lever to throw an electrical switch. When the level of ice delivered to a storage container reaches a specified height, it presses against the rod or lever, thereby repositioning the rod or lever to a cut-off position. Thus, the movement of the rod through a certain distance or the movement of the lever over a specified arc activates a proximity switch to terminate the ice making operation of the apparatus.

In the thermostatic type control systems, the thermostatic sensors are set so that when the ice reaches a certain height, it touches a capillary tube filled with a gas mixture. When the gas cools, it causes an attached diaphragm to move which in turn physically moves a switch from a closed to an open position. This signals the control timer for the given ice machine to terminate the ice-making functions. The temperature sensor can be fixed to the inner wall of the bin. The sensor can itself be inserted into the bin to directly contact with the ice when the ice reaches a predetermined level.

Contact types of level-monitoring sensor devices have problems associated with accuracy and reliability. Most such mechanical and thermostatic types of sensors are placed within the storage bin which they are intended to monitor and rely on contact with ice being stored within the storage bin. Accordingly, they are prone to damage both by contact with ice on a regular basis and moisture seeping into the moving parts and resulting in corrosion of the metallic components of the sensor. In addition, placement within the storage bin exposes such sensors to accidental contact with utensils placed in the storage bin to remove ice therefrom. Even relocating such sensors from the storage bin to locations such as in an ice guide barrel of a discharge port does not solve all of the problems associated with such mechanical and thermostatic devices and in some instances creates additional problems. Thus, even when such sensors are located within an ice guide barrel or delivery chute, particularly in auger-type ice-making machines, such devices still rely on contact between a portion of the sensor and ice being stored in order to activate a proximity switch. Accordingly, while such devices may avoid accidental damage due to contact with utensils in the storage bin, they are still exposed to potential jamming from ice particles and high humidity conditions. Furthermore, to avoid problems associated with particles of ice aggregating and forming larger masses of ice upstream from the mechanical or thermostatic sensors in ice guide barrels, between the sensor and the ice producing device, many ice making machines locate the mechanical and thermostatic sensors remote from the lower open end of the ice guide barrel and place the sensor at an upper end of the barrel closer to the source or feed of the ice and where a large head of ice is less likely to be formed and retained during long intervals between termination and actuation of the ice making device. While solving the problem of reducing accidental damage and allowing for delivery of ice with reduced clogging, this location is somewhat inaccessible and has the disadvantage of making installation, removal and repair more difficult.

Many non-contact sensor systems have been developed and used in recent years in ice storage level control systems. A number of systems use transducer level detectors, one type commonly encountered being an ultrasonic bin level system which compares a reference ultrasonic signal with a reflected signal. A switch is actuated at the desired ice level when the reflected signal overlaps the reference signal of the device. At that point, the reference signal is modified through feedback to prevent short cycling of the ice machine compressor.

Another type of non-contact sensor employed in ice making storage bins includes an "electric-eye" type system, also known as a light interrupter system. This type of sensor system employs a light source located within the storage bin and placed such that a beam of light from a source is focused on a sensor located across the bin. The ice making machine operates as long as the light source is detected by the sensor for a predetermined time period and terminates the operation of the ice making machine when the light source is interrupted for another predetermined time period. When ice supplied to the storage bin reaches a certain height, the light path is interrupted and the ice making device in the machine is terminated after a predetermined of time.

All of these non-contact sensor and level regulating systems used in ice making apparatuses are located within the ice storage bins of the apparatus and most have some of the same advantages and disadvantages as the contact-type sensors. Although non-contact sensor systems are generally not affected by some of the shortcomings of mechanical and thermostatic detection systems, some suffer, to a degree, from some of the problems which affect all sensors located within an ice storage bin, such as high moisture and humidity conditions.

While each of the above-described ice storage bin level detection and regulation systems functions satisfactorily under some conditions and many function well under most conditions, all have certain problems related to their nature and their location, that location most often being within the storage bin of the ice making apparatus.

SUMMARY OF THE INVENTION

What is sought at present, both in commercial ice making apparatuses and home ice making devices is an ice bin control system having a sensor which is durable, reliable, accurate, capable of withstanding both low temperatures and high humidity conditions encountered in ice making apparatuses, and is easily installed and accessible for removal, repair or replacement.

An object of the present invention is an ice making machine having an automatic switch which actuates the ice making device of the machine and which is controlled by a reliable, durable and accurate ice storage bin level sensor of a non-contact type that is so situated as to be minimally sensitive to humidity and temperature conditions. It is also an object of the present invention to provide an improved ice storage bin level sensor for controlling an ice making machine free of moving parts, which is located remote from the bin area. It is an additional object of the present invention to provide an ice storage bin level photoelectric sensor which includes both a light transmitter and receiver in the same unit which is adapted to be located remote from the ice storage bin. Still another object of the invention is to provide an automatic ice making machine employing such photoelectric sensor in a location which is remote from the ice storage bin but is also accessible for removal and installation.

It is also an object of the present invention to provide an ice storage level detecting apparatus, which can be manufactured and provided separately from an ice making machine and can be provided as a kit to be installed in new ice making machines or installed as a retrofit device in existing ice making machines. This ice storage level detecting apparatus has the same objects and features enumerated immediately above.

The aforementioned objects and other objects of the invention are achieved through various embodiments of the present invention described below.

A first aspect of the invention relates to an ice making machine which includes an ice making section, an ice discharge port connected to the ice making section for receiving ice made in the ice making section, an ice storage section for storing ice produced in the ice making section, an ice delivery chute interconnecting the ice discharge port and the ice storage section, and an ice storage level detecting apparatus including an ice storage level sensor disposed in the ice delivery chute proximate an outlet end of said ice delivery chute.

A further aspect of the invention relates to an ice storage level detecting apparatus for an ice making machine which includes an ice storage level sensor, a housing to receive the ice level storage sensor, the housing adapted to be affixed within an ice delivery chute of an ice making machine at or adjacent an outlet of the ice delivery chute.

Since the ice storage bin level sensor of the present invention includes no moving parts and is located remote from the ice storage bin, specifically within the ice storage chute, it remains free from damage during normal usage. It may also be adjusted to detect varying heights of ice such that when the ice in the storage bin reaches a predetermined height, the sensor sends a signal to the ice making device to terminate production of ice. Because the sensor is located remote from the ice storage bin, moisture resulting from contact with ice or condensed moisture does not collect on parts of the sensor.

In the present invention, no special timers are required as are typically used in apparatuses including interrupted beam type photoelectric sensors to allow for breakage of the light path when ice is removed from the storage beam. The sensor used in the present invention is based upon the reflection of a light beam from the surface of the ice within the storage bin which triggers the bin control circuitry. When ice reaches a predetermined height within the storage bin, a light beam is reflected from the surface of the ice and is transmitted to the receiver contained within the device, thereby completing the circuit and causing the sensor to actuate a switch terminating production of ice by the ice making device.

DESCRIPTION OF THE PREFERRED EMBODIMENTS

Figure 1:
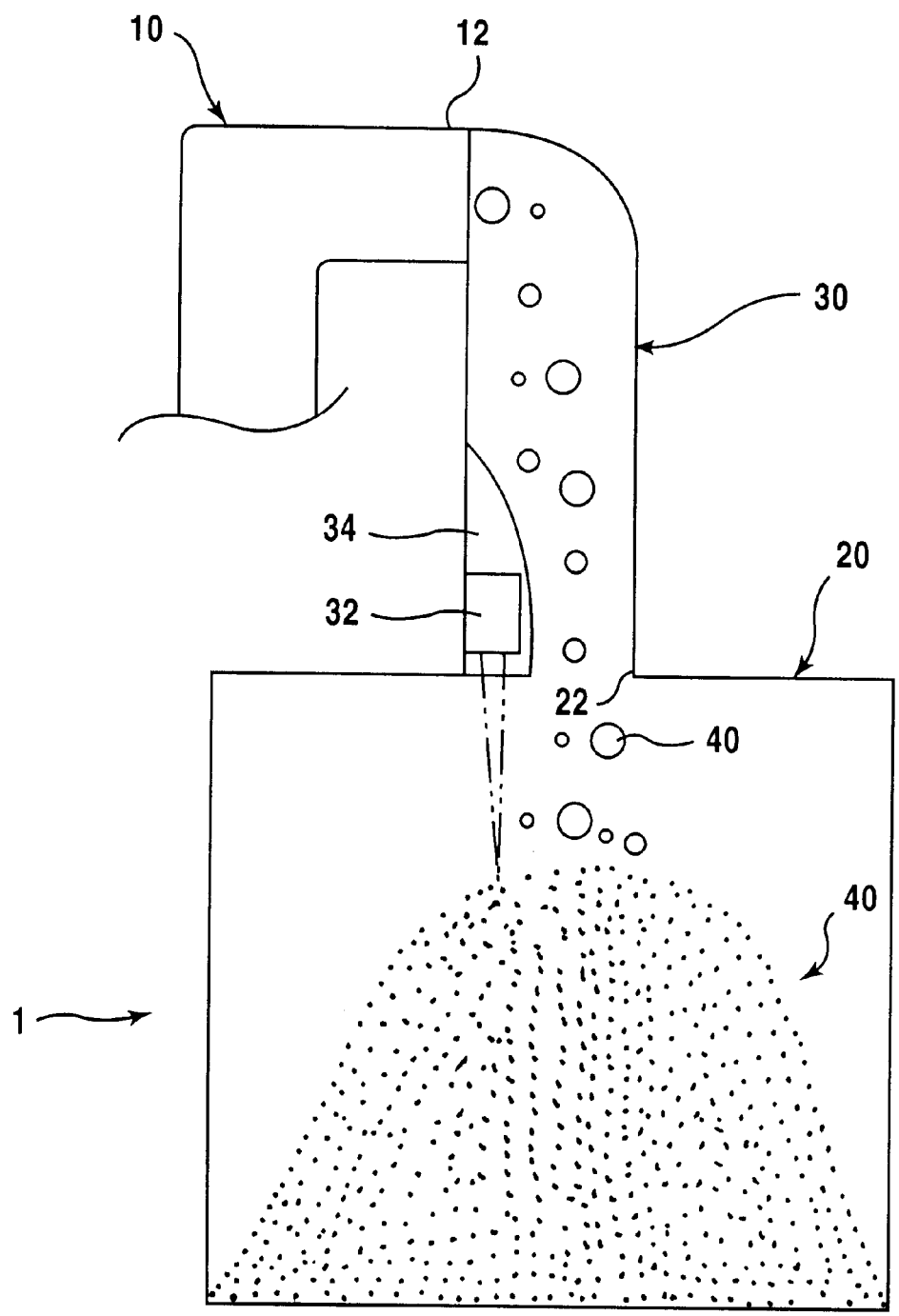
FIG. 1 is a schematic view of an ice making machine according to the present invention.

In the following description, the present invention is described in detail in conjunction with preferred embodiments thereof by reference to the accompanying drawings. It should be noted, however, that the drawing figures are exemplary only and are not to be construed as limiting the scope of the invention in any way.

In the present invention, as illustrated in FIG. 1, an automatic ice making machine, indicated generally by reference numeral 1, is provided which includes an upper portion, typically enclosed within a housing, containing an ice making machine 10, and a lower portion, typically enclosed within a housing, either the same or separate housing from that within which the upper portion is enclosed. The lower portion includes an ice storage bin 20. An ice guide barrel or ice delivery chute 30 is provided at an outlet or discharge port 12 of the ice making machine 10. The ice delivery chute 30 may be arranged at any convenient angle in most conventional apparatuses. However, in the present invention, for reasons discussed below, the ice delivery chute 30 is arranged substantially vertically between the ice storage bin 20 and the ice discharge port 12. The chute 30 is intended to deliver ice 40 in any convenient form, such as chips, flakes and cubes.

The ice making machine 10 may be any conventional refrigeration and ice making device typically used in an automatic ice making machine. Such devices include, but are not limited to, auger-type, cubed ice-type and cublet-type ice making devices. The ice making machine includes standard component parts, such as a compressor, suitable plumbing including a water supply means, electrical switches to actuate the ice making machine, etc.

Once actuated, the ice making machine continues to form ice which is transferred to the ice storage bin 20 through the discharge port 12 and ice delivery chute 30 until such time as the ice making machine is switched off. As with most conventional automatic ice making machines, a sensor and relay apparatus is provided along with suitable control and relay means to turn the ice making machine off once the volume or height of ice within the ice storage bin reaches a predetermined level in order to avoid the accumulation of ice within the ice delivery chute and discharge port of the ice making machine, which ultimately could damage the ice making device.

Figure 2:
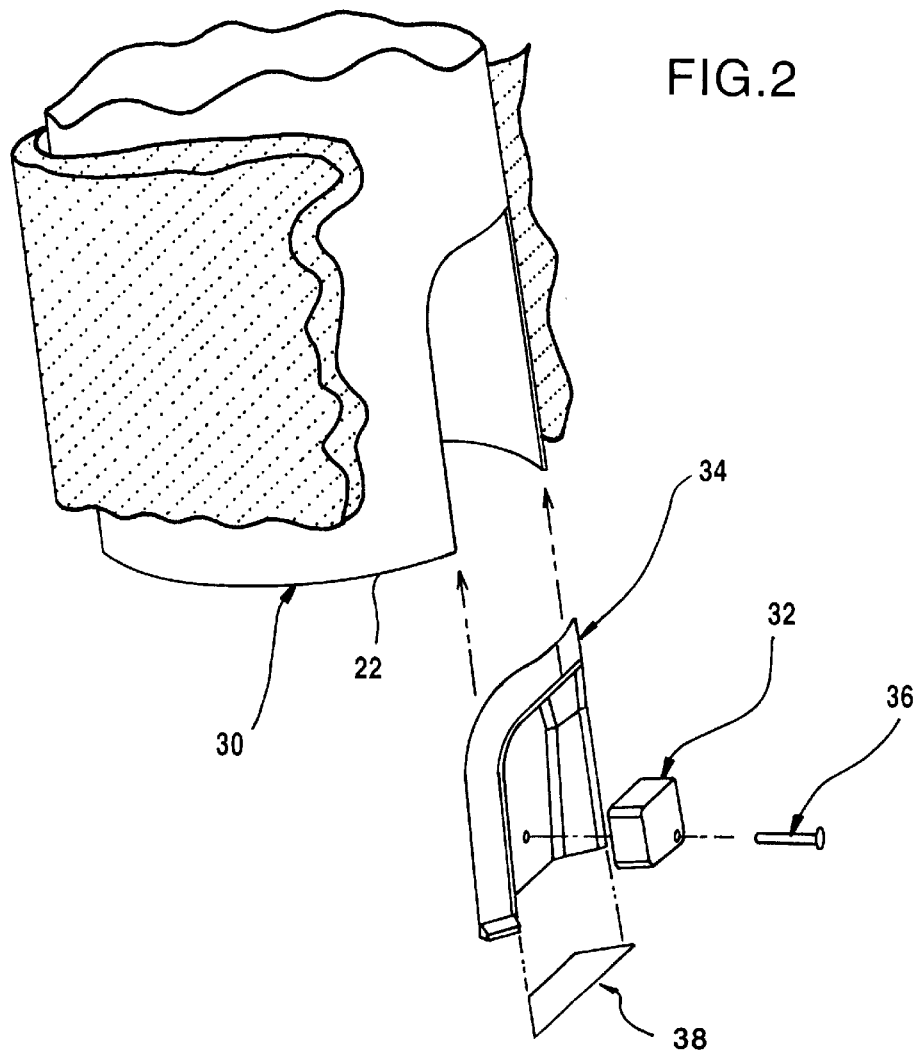
FIG. 2 is an exploded view of a chute assembly containing the sensor of the present invention.

As illustrated in FIGS. 1 and 2, the photoelectric sensor 32 is provided in the discharge chute 30 at or adjacent the outlet end or opening 22 of the discharge chute 30, substantially where the ice delivery chute enters the ice storage bin 20. Preferably, the photoelectric sensor 32 is located within a sensor housing 34 located at or adjacent to the delivery opening 22 of the ice delivery chute 30. As illustrated in FIG. 2, the sensor 32 may be affixed to the housing by any convenient fastener or fastening means, such as an adhesive, a screw or a bolt 36. The sensor housing may be secured in place within the ice delivery chute 30 by a variety of means, depending upon the materials from which the ice delivery chute 30 and sensor housing 34 are formed. Suitable materials include plastic and metals, such as aluminum and rust-resistant steel, with plastic being preferred. The sensor housing may be secured within the ice delivery chute by welding, adhesive means, bolts, screws or other types of fasteners. Preferably, either the ice delivery chute 30 or sensor housing 34 is provided with an engaging portion and the other of the chute or sensor housing is provided with portions which engage the engaging portion, such as a flange section or tab section, etc. Since the sensor 32 is located at or adjacent the lower open end 22 of the ice delivery chute 30, it is much more easily installed and subsequently removed when cleaning and/or replacement becomes necessary.

The photoelectric sensor used in the present invention is of a type which employs light in any portion of the electromagnetic spectrum, preferably in the visible or infrared portion of the spectrum and includes both a light transmitter and a receiving sensor in a single unit.

To minimize light scatter and to provide for maximum reflection of the light from the surface of the ice 40 within the ice storage bin 20 back to the sensor contained within the sensor unit. The photoelectric sensor is mounted such that the transmitted light beam from the photoelectric sensor unit is substantially perpendicular to the floor or base of the storage bin 20 and the reflected light beam coincides substantially in its path with the transmitted light beam. Although it is preferred to arrange the ice delivery chute 30 substantially vertically with respect to the base of the ice storage containing bin in order that the photoelectric sensor 32 be positioned such that the emitted light beam is substantially normal to the surface of the ice 40 contained within the ice storage bin and coincides with the reflected light, it is not absolutely necessary to do so. Thus, the path of the ice delivery chute 30 may be arranged at a slight angle with respect to the vertical and either the wall of the sensor housing 34 on which the photoelectric sensor is mounted is formed to orient the photoelectric sensor with the transmitted beam in substantially a vertical position, or adjustment means such as shims and/or adjustment screws are provided to position the photoelectric sensor unit 32 with respect to the wall of the housing in which it is located.

Preferred as the photoelectric sensors of the present invention are those which are resistant to humidity. Although the location of the photoelectric sensor within the sensor housing located in and at or adjacent the lower end of the ice delivery chute 30 significantly reduces the exposure to the high humidity conditions of the ice storage bin, employing a photoelectric sensor of the type described above which has less sensitivity to humidity is preferred. The lower open end of the photoelectric sensor housing 34 may also be provided with a light transmissive covering 38, such as a glass or plastic sheet or film, placed below the sensor to fully enclose the photoelectric sensor (with the exception of openings for appropriate electrical connections) from moisture.

In addition to being relatively insensitive to high humidity and moisture conditions, sensors preferred in the present invention should also be operative in a temperature range well below the freezing point of water to substantially above ambient temperatures, from about −150 to about +45° C. and in ambient humidity conditions from about 40 to about 80% relative humidity. Preferred sensors for the present invention also include trigonometric sensors which may be easily adjusted for a variety of heights of ice stored in an ice storage bin.

Preferred as a sensor in the present invention is a trigonometric reflective photoelectric sensor manufactured by Matsushita Electric Works, designated as Model No. NAIS UZD12. This sensor has an adjustable range of from 30 to 200 mm. The sensor is operational in an environment with temperatures ranging from −20 to +55° C. and an ambient humidity of from 35 to 85% relative humidity. The sensor operates as a light beam-receiving device and recognizes when the reflected light beam is received, not the quantity of light being received. Therefore, this sensor is especially suitable as an "on-off" control device for the present ice making machine. Other preferred sensors suitable for use in the present invention are manufactured by SUNX Trading Company, Ltd., and particularly preferred are those designated by Model Nos. CX22 or CX24. Aromat Corporation also manufactures suitable combination transmission receiver sensors which may be used in this invention.

Figure 3:
FIG. 3 is a schematic diagram of the parts of the detection and control system of the present invention.

As illustrated in FIG. 3, the ice bin circuit employed in the present invention is composed of the photoelectric bin sensor detector, bin control relay and power supply, electrically connected to one another. This circuit is sent through to a control timer to control the ice making machine.

The first operation of the machine is the power switch being energized. When energized, a signal is sent to the bin control sensor to check the level of ice. If no signal is sent back, then the ice level is low and a signal is sent to energize the water control relay to fill the water reservoir. Once the water reservoir is filled, a signal is sent to the control timer to start ice making, ice is produced and sent through the chute to supply ice to the bin. A beam generated at the sensor is reflected back to the photoelectric sensor when ice reaches a predetermined level. This breaks the circuit to the control timer and all ice making functions are terminated. Timer controls are in use to have certain time increments to cut off the compressor at a predetermined time and the gear motor at a predetermined time. Depending on the type of ice machine used, this control feature could change to compensate for proper parts.

Figure 4:
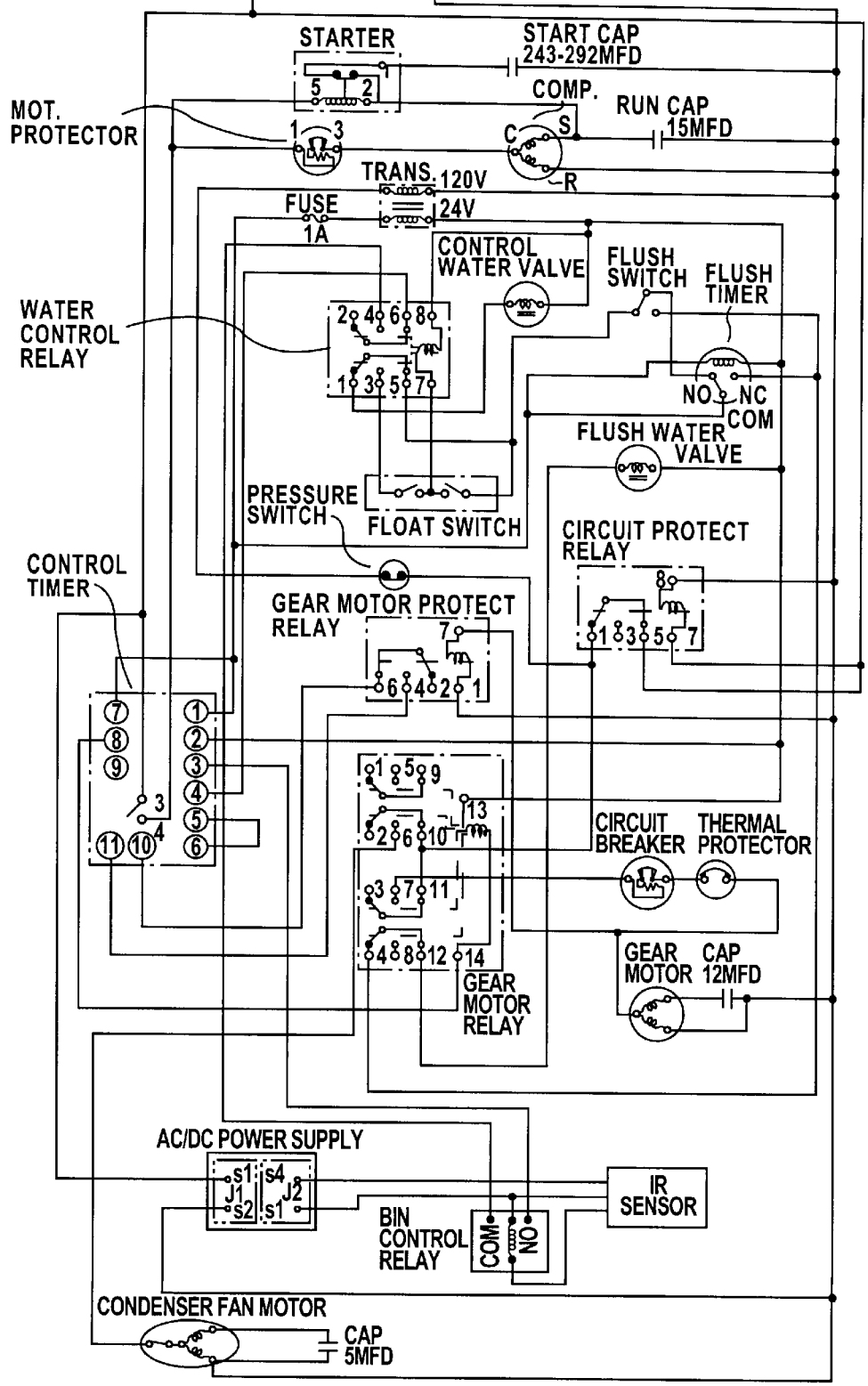
FIG. 4 is a wiring diagram illustrating the electrical circuitry and component parts of the electrical sensing and control system of the present invention.

An exemplary wiring diagram for an ice making machine control system of the type which includes the present invention is presented in FIG. 4. In operation, the power switch is turned on and electrical power is supplied through the circuit to the photoelectric sensor 32. Light is then emitted from the sensor toward the ice storage bin located below the ice delivery chute 30 and photoelectric sensor 32. Until such time that ice has accumulated in the ice storage bin 20 to the predetermined level at which light is reflected from the surface of the accumulated ice and detected by the sensor, the bin control relay connected to and operated by the sensor is energized. Once a water reservoir in the ice making device is filled, the water control relay is energized and current is routed to terminals ③ and ④ of the control timer (as shown in FIG. 4, in which terminal ③ of the control timer is electrically connected to the bin control relay and terminal ④ is electrically connected to the water control relay) from the sensor. After terminals ③ and ④ close, the ice machine starts, i.e., power is supplied to the compressor and the gear motor. When ice accumulation is sufficient to reflect the transmitted light beam back to the light sensing portion of the single unit sensor (i.e., the upper level of ice is at the preselected height), the sensor interrupts supply of current to the bin control relay. The relay coil is thus denergized and breaks the circuit to terminals ③ and ④ of the control timer. This in turn terminates the ice making functions.

Considering the ease of installation and removal from an ice delivery chute, the sensor and sensor housing of the present invention can be used as a kit to modify existing ice making machines. Thus, the sensor and sensor housing of the invention could be installed at the outlet end of an ice delivery chute and electrically connected to an existing wiring circuit in place of the original sensor employed.

What is claimed is:

1. An ice making machine, comprising:

an ice making section;

an ice discharge port connected to said ice making section for receiving ice made in said ice making section;

an ice storage section for storing ice produced in said ice making section;

an ice delivery chute interconnecting said ice discharge port and said ice storage section; and an ice storage level detecting apparatus including an ice storage level sensor disposed in said ice delivery chute proximate an outlet end of said ice delivery chute, wherein said ice level sensor comprises a photoelectric sensor, and wherein said photoelectric sensor comprises a light transmitting device and a light receiving sensor device in a single unit.

2. An ice making machine according to claim 1, wherein said ice storage level sensor is provided within a housing in said ice delivery chute.

3. An ice making machine according to claim 2, wherein said housing includes a film intermediate the ice level sensor and the ice storage bin that is transparent to light in the portion of the spectrum which is transmitted and detected by said sensor.

4. An ice making machine according to claim 1, further including an ice bin circuit comprising a photoelectric sensor, a bin control relay and a control timer.

5. An ice storage level detecting apparatus for an ice making machine comprising an ice storage level sensor, and a housing to receive said ice level storage sensor, said housing adapted to be affixed within an ice delivery chute of an ice making machine at or adjacent an outlet of said ice delivery chute, wherein said ice level sensor comprises a photoelectric sensor that comprises a light transmitting device and a light receiving sensor device in a single unit.

6. An ice making machine according to claim 5, wherein said housing includes a film disposed below the ice level sensor which is transparent to light in the portion of the spectrum that is transmitted and detected by said sensor.

* * * * *